United States Patent [19]

Matsushita

[11] Patent Number: 4,964,298
[45] Date of Patent: Oct. 23, 1990

[54] DEVICE FOR CONTROLLING THE AIR PRESSURE IN THE LOW PRESSURE ENVIRONMENTAL TESTING CHAMBER FOR SELF-PROPELLED VEHICLES

[75] Inventor: Kyozo Matsushita, Tokyo, Japan

[73] Assignee: Kabushiki-kaisha Toyo Seisakusho, Tokyo, Japan

[21] Appl. No.: 253,304

[22] Filed: Sep. 29, 1988

Related U.S. Application Data

[63] Continuation of Ser. No. 23,458, Mar. 9, 1987, abandoned.

[30] Foreign Application Priority Data

Mar. 2, 1987 [JP] Japan ................... 62-047326

[51] Int. Cl.[5] ............................................ G01M 15/00
[52] U.S. Cl. ................................................... 73/117.1
[58] Field of Search ................... 73/865.6, 117.1; 137/81.1

[56] References Cited

U.S. PATENT DOCUMENTS

| 1,503,307 | 7/1924 | Durr | 73/117.1 |
| 1,827,530 | 10/1931 | Grand | 73/865.6 |
| 3,018,561 | 1/1962 | Wells | 73/865.6 |
| 3,996,793 | 12/1976 | Topper | 73/117.1 |
| 4,030,350 | 6/1977 | Bier | 73/117.1 |

FOREIGN PATENT DOCUMENTS 301256  7/1919  Fed. Rep. of Germany ..... 73/117.1

OTHER PUBLICATIONS

Translation of Ger. Pat. No. 301,256.

*Primary Examiner*—Stewart J. Levy
*Assistant Examiner*—Robert R. Raevis
*Attorney, Agent, or Firm*—Frishauf, Holtz, Goodman & Woodward

[57] ABSTRACT

A device for controlling the air pressure within a low pressure environmental testing chamber for a self-propelled vehicle is disclosed. According to the invention, the device includes a system for introducing the outside air into the testing chamber, a first air pipe having an air suction port at its one end positioned in the vicinity of a discharge opening of a discharge duct of the vehicle disposed in the testing chamber and having its other end connected to a main air pipe, a second air pipe having an air inlet at its one end opened into the testing chamber and having its other end connected to the main air valve, an air blower adapted for reducing the air pressure, the air blower having a variable r.p.m. and mounted halfway in the main air pipe, a first silencer provided in the main air pipe at the air discharge side of the air blower and opened into atmosphere, and a branched pipe having a second silencer at an outside air intake side. The branched pipe has the end opposite to the second silencer connected to the main pipe at the suction side of the air blower. The branched pipe also has a second pressure regulating valve halfway between the second silencer and the end connected to the main air pipe.

3 Claims, 1 Drawing Sheet

DEVICE FOR CONTROLLING THE AIR PRESSURE IN THE LOW PRESSURE ENVIRONMENTAL TESTING CHAMBER FOR SELF-PROPELLED VEHICLES

This application is a continuation of application Ser. No. 023,458 now abandoned, filed Mar. 9, 1987.

BACKGROUND OF THE INVENTION

Field of the Invention

This invention relates to an air pressure control device for use in a testing chamber in which to conduct low pressure environmental tests of a self-propelled vehicle, especially an automobile, under assumed running of the vehicle on the terrain of higher altitudes.

FIG. 2 shows a conventional air pressure controlling system for setting the desired lower air pressure in the testing chamber.

Referring to FIG. 2, an automobile 21 is arranged in the low pressure environmental testing chamber 22 into which the outside air supplied by an air-supplying blower 25 via an air intake port 24 at the foremost part of an air supply duct 23 is introduced by way of a flow adjustment valve 26 and a throttle 27. The adjustment valve 26 is controlled by the output of a flow meter 28 connected parallel to the throttle 27.

An air pipe 29 for air discharging has a foremost air intake 30 positioned in the vicinity of a discharge opening of a discharge duct 21a of the automobile 21. The engine emission gases of the automobile 21 and the air in the testing chamber 22 are drawn by the pressure reducing air blower 32 by way of a pressure regulating valve 31 so as to be discharged by way of a silencer 33. The pressure regulating valve 31 is adjusted by output signals of a pressure sensor 34 provided in the testing chamber 22. A vacuum breaker 35 is provided between the pressure regulating valve 31 and the pressure reducing blower 32 so as to be in operation when the air pressure in the testing chamber 22 falls to lower than a prescribed lower value.

In the above described conventional air pressure controlling system, the air inlet 30 is opened in the vicinity of the discharge opening of the discharge duct 21a because of the necessity of discharging the engine emission gases out of the testing chamber. The engine emission gases and the air in the testing chamber 22 are discharged only by way of the air inlet 30 for setting the prescribed low air pressure in the testing chamber.

Thus the conventional control device has an inconvenience that the discharge opening of the discharge duct 21a is affected by the back pressure of the pressure reducing air blower 32. When the emission gases are discharged by way of the discharge duct 21a, these gases are introduced into the inlet 30 so that the intake volume of the air in the testing chamber is correspondingly reduced. Above all, when the r.p.m. of the automobile engine is changed abruptly, the air pressure at the discharge opening of the discharge duct 21a is subject to disturbances such that the air pressure at the discharge opening is no longer coincident with that in the testing chamber.

As a result thereof, the engine emission gases are discharged by way of the discharge opening of the discharge duct 21a at an air pressure different from that in the testing chamber 22 so that the testing can no longer be conducted under simulated natural environmental conditions.

Moreover, it has been difficult with the conventional control device to control the air pressure with high accuracy since the totality of the air passing through the air discharge pipe 29 is conveyed through the pressure regulating valve 31 so that it becomes necessary to use the valve of a larger size as the valve 31.

SUMMARY OF THE INVENTION

It is a principal object of the present invention to provide an air pressure control device for a low pressure environmental testing chamber for a self-propelled vehicle wherein control is so made that the discharge opening of the discharge duct of the automobile is not affected by the back pressure at the suction side of the pressure reducing air blower and that the air pressure prevailing at the discharge opening is equal at all times to that prevailing in the testing chamber.

It is another object of the present invention to provide such control device wherein the air pressure control in the testing chamber may be controlled with improved accuracy.

In view of these objects, the present invention provides a device for controlling the air pressure within a low pressure environmental testing chamber for self-propelled vehicles, comprising means for introducing outside air into the testing chamber;

a first air pipe having an air suction port at one end therof positioned in the vicinity of a discharge opening of a discharge duct of the vehicle disposed in the testing chamber and having the other end therof connected to a main air pipe;

a second air pipe having an air inlet at one end thereof opened into the testing chamber and having the other end thereof connected to said main air pipe through a first flow regulating valve;

an air blower adapted for reducing the air pressure, said air blower having a variable r.p.m. and mounted halfway in said main air pipe;

a first silencer provided in said main air pipe at the air discharge side of said air blower and opened into atmosphere; and a branched pipe having a second silencer at an outside air intake side, said branched pipe having the end opposite to said second silencer connected to said main pipe at the suction side of said air blower, said branched pipe also having a second pressure regulating valve halfway between the second silencer and said end connected to said main air pipe.

DESCRIPTION OF THE PREFERRED EMBOIMENTS

An illustrative embodiment of the present invention is now explained by referring to the accompanying drawings.

Figure 1:
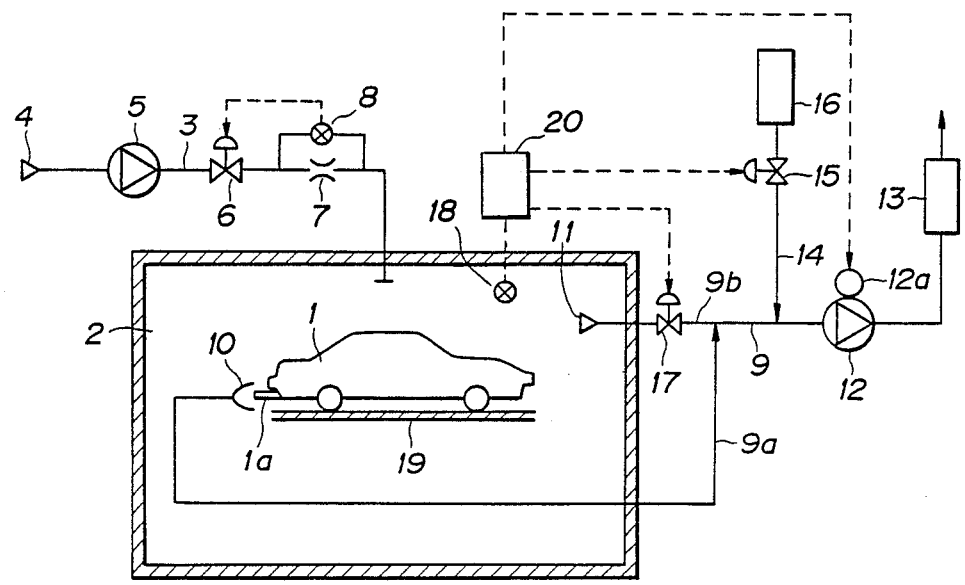
FIG. 1 is a diagrammatic view showing an air pressure control device for a low pressure environmental testing chamber according to the present invention.
Figure 2:
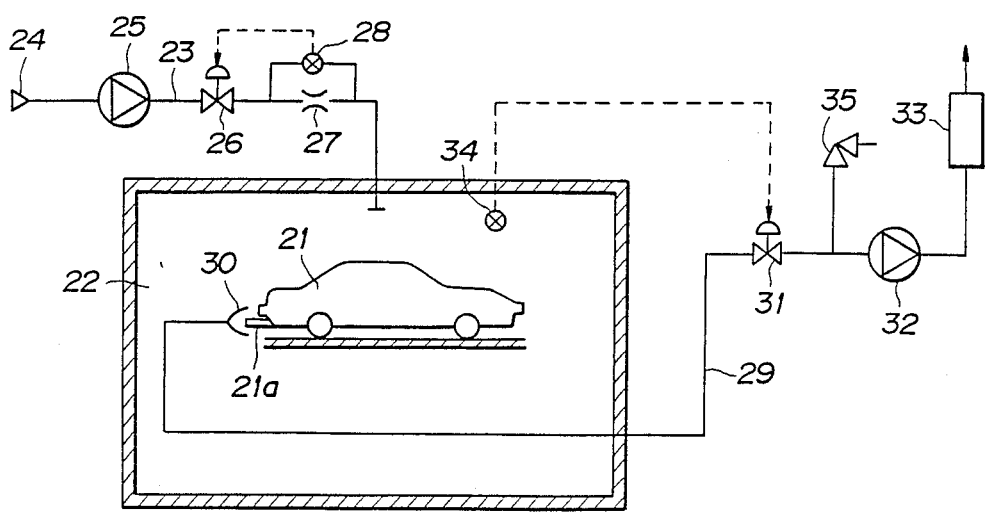
FIG. 2 is a diagrammatic view showing a conventional air pressure control device.

Referring to FIG. 1, a self-propelled vehicle, such as an automobile 1, is placed on a testing base 19 within a low pressure environmental testing chamber 2. The atmospheric air is introduced into the chamber 2 by an air supply blower 5 through a flow adjustment valve 6 and a throttle 7 provided at the foremost part of an air pipe 3. The adjustment valve 6 is adjusted by output signals of a flow meter 8 connected in parallel with the throttle 7.

The air supply system described above is in use when a prescribed amount of the outside air is to be introduced into the testing chamber 2 at the time of pressure reduction in the chamber, or when the air pressure once set to an air pressure lower than the atmospheric presure is to be reset promptly to a pressure closer to the atmospheric pressure.

In the vicinity of a discharge opening of a discharge duct 1a for automobile 1, there is arranged an air inlet 10 at the foremost part of an air duct 9a for air discharge which is connected to a main air pipe 9.

An air suction port 11 provided to the foremost part of a second air duct 9b for air discharge is opened into the testing chamber 2. A flaw regulating valve 17 is provided in the air duct 9b which in turn is connected to the main air pipe 9.

An air blower 12 for pressure reduction is mounted in the main air pipe 9 so as to be driven by an electric motor with a variable r.p. m. By the operation of the air blower 12, the emission gases from the automobile 1 and the air in the testing chamber 2 are imbibed by way of the air inlet 10, while tha air in the testing chamber 2 is also imbibed by way of the air suction port 11. The air imbibed by the blower 12 is discharged out of the chamber 2 by way of a silencer 13.

At the air suction side of the air blower 12, a branched pipe 14 is connected to the main air pipe 9, and a second pressure regulating valve 15 is mounted in the branched pipe 14. To the foremost part of the branched pipe 14 is connected a second silencer 16 for intake of atmospheric air so as to be opened to atmosphere.

The opening degree of the pressure regulating valves 15 and 17 and the r.p.m. of the electric motor 12a may be controlled separately by output signals supplied from a pressure sensor 18 and by the operation of a control system 20, such as a microcomputer.

In the above described construction of the air pressure control device of the present invention, the air in the testing chamber 2 is not introduced forcibly through the discharge opening of the air discharge duct 1a but introduced by both of the air inlet 10 and the suction port 11, so that the engine operation is not affected by the back pressure exerted by the air blower 12. When the r.p.m. of the automobile engine is changed with resulting abrupt changes in the amount of the engine emission gases, the pressure regulating valve 17 is correspondingly adjusted for controlling the air amount in the testing chamber 2 introduced by suction through the air inlet 11. In such manner, fluctuations in the air pressure are not caused at the air discharge opening of the air duct 1a so that it is possible to control perpetually the air pressure in the discharge opening and that in the testing chamber 2 so as to be at the same level. This permits testing to be conducted under simulated natural environmental conditions.

In addition, in the above described air pressure control device of the present invention, setting of the air pressure in the testing chamber 2 is achieved by controlling the r.p.m. of the pressure-reducing air blower 12 and also by adjusting the pressure regulating valve 15 for controlling the intake of the outside air, so that accuracy in air pressure control may be improved as compared to the conventional system in which only the pressure regulating valve provided in the main air pipe is used for air pressure setting. Since the pressure regulating valve is not provided in the main air pipe as in the conventional practice, but the pressure regulating valve 15 is provided in the branched pipe 14, the amount of air passing through the pressure regulating valve 15 is markedly reduced so that a small sized valve may be used as the pressure regulating valve 15. The result is the reduced diameter of the pressure regulating valve 15 and a further improved accuracy in the control of the air pressure in the testing chamber 2.

Also, in distinction from the conventional system in which only the air in an area of the testing chamber presenting a larger suction resistance is imbibed by the pressure reducing air blower, the air in the state closer to that of atmospheric air is also imbibed through the branched pipe 14 from another area in the testing chamber presenting a lesser suction resistance. In such manner, the more the air pressure setting in the testing chamber 2 approaches the atmospheric pressure, the lesser becomes the driving power required of the pressure reducing air blower 12, so that the noise caused by the air blower 12 is correspondingly lowered.

What is claimed is:

1. A device for controlling the air pressure in a low pressure environmental testing chamber for self-propelled vehicles, comprising:

means for introducing outside air into the testing chamber;

a first air pipe having an air suction port at one end thereof positioned in the vicinity of a discharge opening of a discharge duct of a vehicle disposed in said testing chamber and having the other end thereof connected to a main air pipe;

a second air pipe having an air inlet at one end thereof opened into said testing chamber and having the other end thereof connected to said main air pipe through a first flow regulating valve;

an air blower adapted for reducing air pressure in said testing chamber, said air blower having a variable r.p.m. and mounted in said main air pipe to selectively communicate said testing chamber with the atmosphere;

a first silencet provided in said main air pipe at an air discharge side of said air blower, said silencer being opened into the atmosphere; and a branched pipe having a second silencer at an outside-air-intake end thereof, said branched pipe having an end opposite to said second silencer connected to said main pipe between an output of said first flow regulating valve and a suction side of said air blower, said branched pipe having mounted therein a second flow regulating valve between said second silencer and said end connected to said main air pipe;

a pressue sensor disposed within said testing chamber; and means responsive to an output signal of said pressure sensor for controlling said first and second flow regulating valves to maintain the air pressure in the environmental testing chamber at a preset level.

2. A device as claimed in claim 1 wherein said means for introducing outside air comprises an air supply duct having one end adapted as an air intake port opened into atmosphere and the other end opened into said testing chamber, a series connection comprising an air-supplying air blower, a flow adjustment valve and a throttle and mounted in said air supply duct, and a flow meter connected parallel to said throttle, said flow adjustment valve being controlled by the output of said flow meter.

3. A device as claimed in claim 1, wherein said control means is coupled to said air blower for controlling the r.p.m. thereof to maintain the air pressure in the environmental testing chamber at a preset level.

* * * * *